(12) United States Patent
Ramirez Pavon et al.

(10) Patent No.: US 10,543,788 B2
(45) Date of Patent: Jan. 28, 2020

(54) DEPLOYABLE REAR VIEW MIRROR MOBILE DEVICE HOLDER

(71) Applicant: Ford Global Technologies, LLC, Dearborn, MI (US)

(72) Inventors: Omar Antonio Ramirez Pavon, Atizapan de Zaragoza (MX); Edgar Javier Ortega, Tlalnepantla (MX); Leonardo Alonso Huitron, Naucalpan de Juarez (MX); Allan Alberto Mejia Jaramillo, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 15/590,493

(22) Filed: May 9, 2017

(65) Prior Publication Data

US 2018/0326910 A1 Nov. 15, 2018

(51) Int. Cl.
 *B60R 1/12* (2006.01)
 *B60R 1/04* (2006.01)
 *B66C 1/16* (2006.01)
 *B60R 1/02* (2006.01)
 *B60R 11/00* (2006.01)

(52) U.S. Cl.
 CPC .............. *B60R 1/12* (2013.01); *B60R 1/04* (2013.01); *B66C 1/16* (2013.01); *B60R 1/02* (2013.01); *B60R 2001/1215* (2013.01); *B60R 2001/1292* (2013.01); *B60R 2011/0003* (2013.01)

(58) Field of Classification Search
 CPC ............. B60R 11/02; B60R 2011/0033; B60R 11/0241; B60R 1/04; B60R 1/12; B60R 2001/1253; B60R 2001/1276
 USPC ...... 296/1.11, 152, 180.1, 146.5, 146.6, 1.03, 296/1.07, 24.34, 37.7; 359/871, 841, 872, 359/507, 844, 850, 509, 549, 868, 877
 See application file for complete search history.

(56) References Cited

U.S. PATENT DOCUMENTS

| | | | |
|---|---|---|---|
| 8,308,310 B2 * | 11/2012 | Sakamoto | B60R 1/04 359/841 |
| 9,079,540 B2 * | 7/2015 | Harding | B60R 11/02 |
| 2002/0041497 A1 * | 4/2002 | Ichikawa | B60R 1/1207 362/494 |
| 2007/0133112 A1 * | 6/2007 | Chia | B60R 1/12 359/871 |
| 2011/0080481 A1 * | 4/2011 | Bellingham | B60R 1/12 348/148 |
| 2012/0080465 A1 * | 4/2012 | Son | B60R 11/02 224/276 |
| 2012/0120239 A1 * | 5/2012 | Hutzel | B60R 1/008 348/143 |
| 2013/0292959 A1 * | 11/2013 | West | B60R 1/04 296/1.11 |

(Continued)

*Primary Examiner* — D Glenn Dayoan
*Assistant Examiner* — Sunsurraye Westbrook
(74) *Attorney, Agent, or Firm* — Vichit Chea; Brooks Kushman, P.C.

(57) ABSTRACT

A mobile device holder for a rear-view mirror of a vehicle may include a mirror housing and a mobile device bracket arranged at least partially therein in a stored position, and a deployment mechanism connected to the bracket and including a torsion spring configured to rotatedly hinge the bracket from the stored position to a deployed position extending out of the housing in response to actuation of the torsion spring.

13 Claims, 5 Drawing Sheets

(56) References Cited

U.S. PATENT DOCUMENTS

2015/0380970 A1* 12/2015 Vu .......................... H02J 7/025
                                                    320/108
2016/0236626 A1    8/2016 Yialamas

* cited by examiner

US 10,543,788 B2

DEPLOYABLE REAR VIEW MIRROR MOBILE DEVICE HOLDER

TECHNICAL FIELD

Disclosed herein are deployable rear view mirror mobile device holders.

BACKGROUND

With an increased use of mobile devices, users are susceptible to becoming distracted, especially during driving. Users may often text, use navigation applications, audio controls, etc. Such distractions may lead to the driver taking his or her focus from the task at hand. Even if a driver is not actively engaging with his or her mobile device, simply handling or holding the device may prevent the driver from affectively maintaining two hands on a steering wheel.

SUMMARY

A mobile device holder for a rear-view mirror of a vehicle including a mirror housing and a mobile device bracket arranged at least partially within the housing in a stored position, and a deployment mechanism connected to the bracket and including a torsion spring configured to hinge the bracket from the stored position to a deployed position extending out of the housing in response to actuation of the torsion spring.

A method for deploying and storing a bracket for a mobile device from a vehicle rear view mirror, the method may include receiving an actuation at a button on an exterior of a rear view mirror housing, linearly translating a spring casing having a latch in response to the actuation of the button, disengaging the latch from a notch within the button allowing rotational translation of the spring casing with respect to the button, and pivoting a bracket connected to the spring casing from a stored position arranged behind the mirror housing to a deployed position arranged exterior and below the mirror housing.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle mobile device bracket is disclosed herein. The bracket may be configured to attach to a vehicle rear view mirror and be movable from a stored position to a deployed position. The bracket may be deployable by selecting a button on a side of the rear-view mirror. The bracket may include an arm that extends downward in the deployed position. A magnet is arranged on the end thereof. The magnet is configured to interface with a second magnet attached to the mobile device. Thus, the mobile device may be magnetically attached to the bracket.

The bracket may deploy from the mirror via a deploying mechanism that includes a torsion spring configured to rotate the bracket downward from the stored position. The mechanism may include a locking feature having a notch and a latch to prevent rotational movement when the bracket is in one of the stored or deployed positions, but allowing for rotational movement thereof to transition from the two positions. The locking mechanism may be biased by a linear spring to maintain the latch within the notch. Upon release of the latch from the notch via actuation of the button, a torsion spring may cause a rotational translation of the deploying mechanism and thus the bracket, allowing the bracket to move from one position to the next.

The bracket may also include a microUSB (micro universal serial bus) connection allowing for a wired connection between the mobile device and the vehicle. This connection may permit download of data and application from the mobile device to the vehicle. This data may include data acquired via the mobile device's camera. In one example, the camera may capture a real-time recording of the front part of the vehicle, similar to a dash camera. In another example, the camera may acquire "selfie" photos of the driver and/or vehicle occupants. The data may be acquired and stored via a vehicle telematics systems such as the SYNC application.

Figure 1:
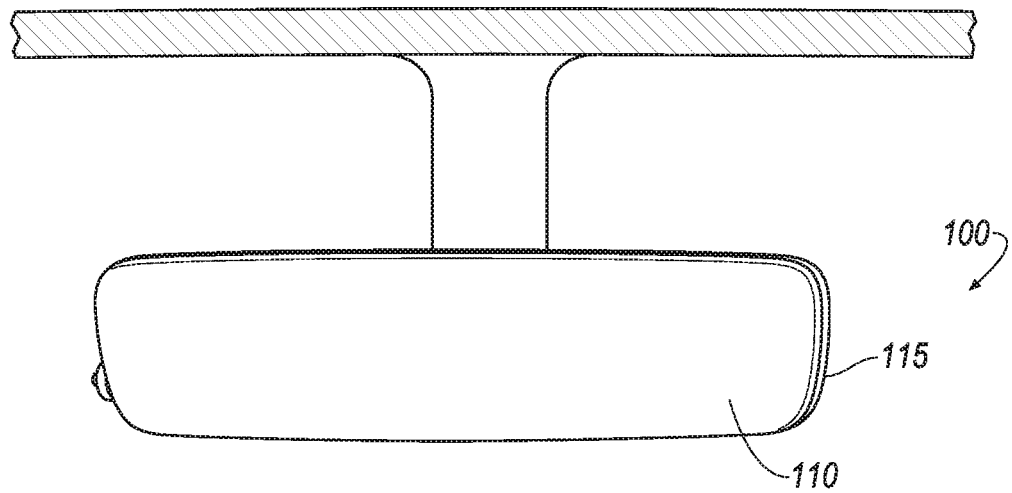
FIG. 1 illustrates an example vehicle rear-view mirror assembly having a mobile device bracket in the stored or latched position.

FIG. 1 illustrates an example vehicle rear-view mirror assembly 100 having a mobile device bracket 105 (not shown in FIG. 1) in the stored or latched position. The rear-view mirror assembly 100 may include a mirror 110 and may extend downward from a vehicle ceiling or roof to provide a mirror image of the area behind the vehicle. The mirror 110 may be arranged in a mirror housing 115. The mirror housing 115 may be made of stamped plastic and may be configured to maintain a deploying mechanism (described in more detail with respect to FIG. 4), therein.

Figure 6:
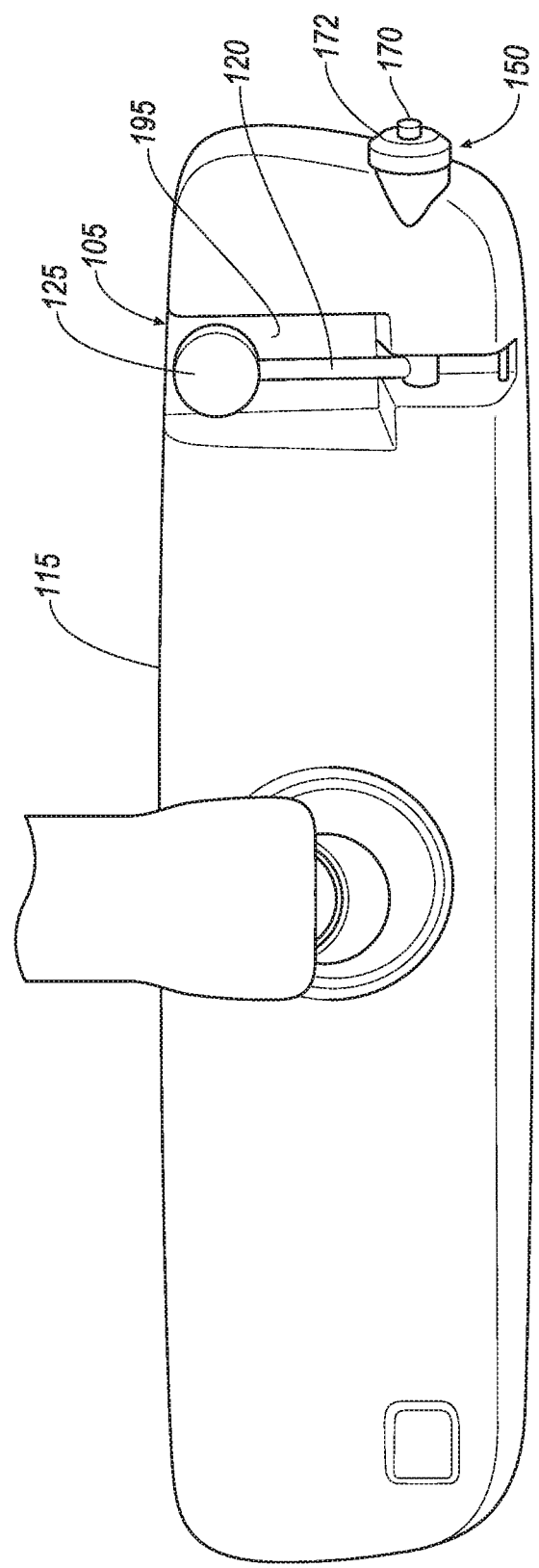
FIG. 6 illustrates a rear view of the rear-view mirror assembly illustrating a bracket recess for maintaining the bracket when the bracket is in the stored position.

During non-use, the mobile device bracket 105 may be stored in a recess (as shown in FIG. 6). Thus, the mobile device bracket 105 may be out of sight of the driver and other occupants and not provide for any obstruction of the windshield or mirror.

Figure 2:
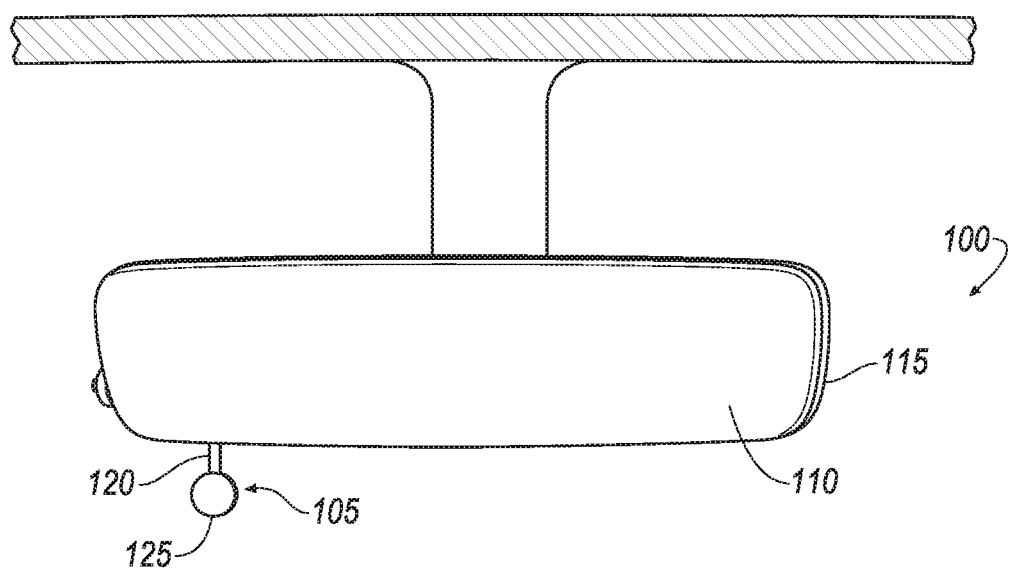
FIG. 2 illustrates an example vehicle rear-view mirror assembly having a mobile device bracket in the deployed position.

FIG. 2 illustrates the example vehicle rear-view mirror assembly 100 having the mobile device bracket 105 in the deployed position. The mobile device bracket 105 may include a bracket arm 120 and a magnet 125 arranged on the end of the bracket arm 120. The bracket arm 120 and the magnet 125 may be stored behind the mirror housing 115 in the stored position as shown in FIG. 1, to provide an unobstructed view during non-use.

While the magnet 125 is illustrated as forming a circular shape, various other shapes may be used. The opposite magnet (not shown) arranged on or at the mobile device 130 may be a separate magnet configured to be placed inside a mobile device case. The opposite magnet may also be adhered to the back of the mobile device 130 via glue, or other adhesive.

Figure 3:
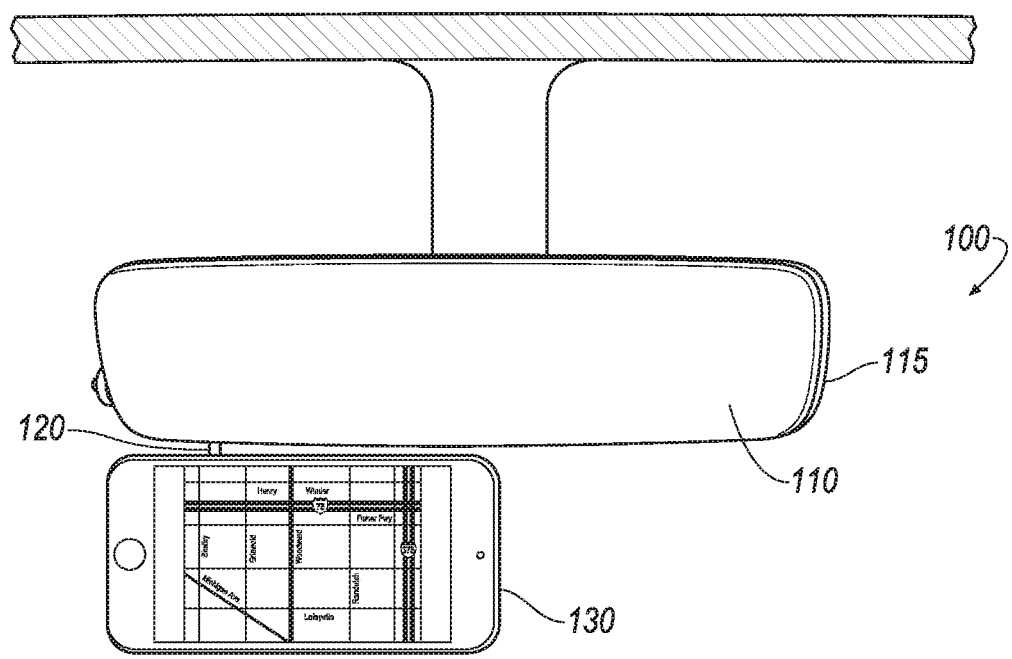
FIG. 3 illustrates an example vehicle rear-view mirror assembly having a mobile device arranged on the mobile device bracket of FIG. 2.

FIG. 3 illustrates the example vehicle rear-view mirror assembly 100 having a mobile device 130 arranged on the mobile device bracket 105 of FIG. 2. The magnet 125 may be configured to interface with a magnet arranged on a mobile device 130 (shown in FIG. 3). The magnet 125 may form an attachment with the opposite magnet on the mobile device 130 so as to sustain the mobile device 130 on the mobile device bracket 105. The magnetic hold may be of sufficient strength to maintain the mobile device 103 on the bracket 105 during use without undue movement of the mobile device 130 with respect to the mirror 110. This includes various movement caused by the vehicle such as vibrations caused by driving over rough terrain. That is, the mobile device 130 may maintained an orientation with respect to the mirror. The magnetic hold may, however, allow the driver, to easily disengage the mobile device 130 from the bracket 105.

The mobile device 130 is illustrated as being a cellular phone herein, though other types of mobile devices such as tablet computers, hand held devices, navigation devices such as global positioning systems (GPS), etc., may be included as the mobile device 130. Once the driver has completed his or her trip, the driver may easily remove the mobile device 130 from the bracket 105 and the bracket 105 may return to a stored position as illustrated in FIG. 1.

Figure 4:
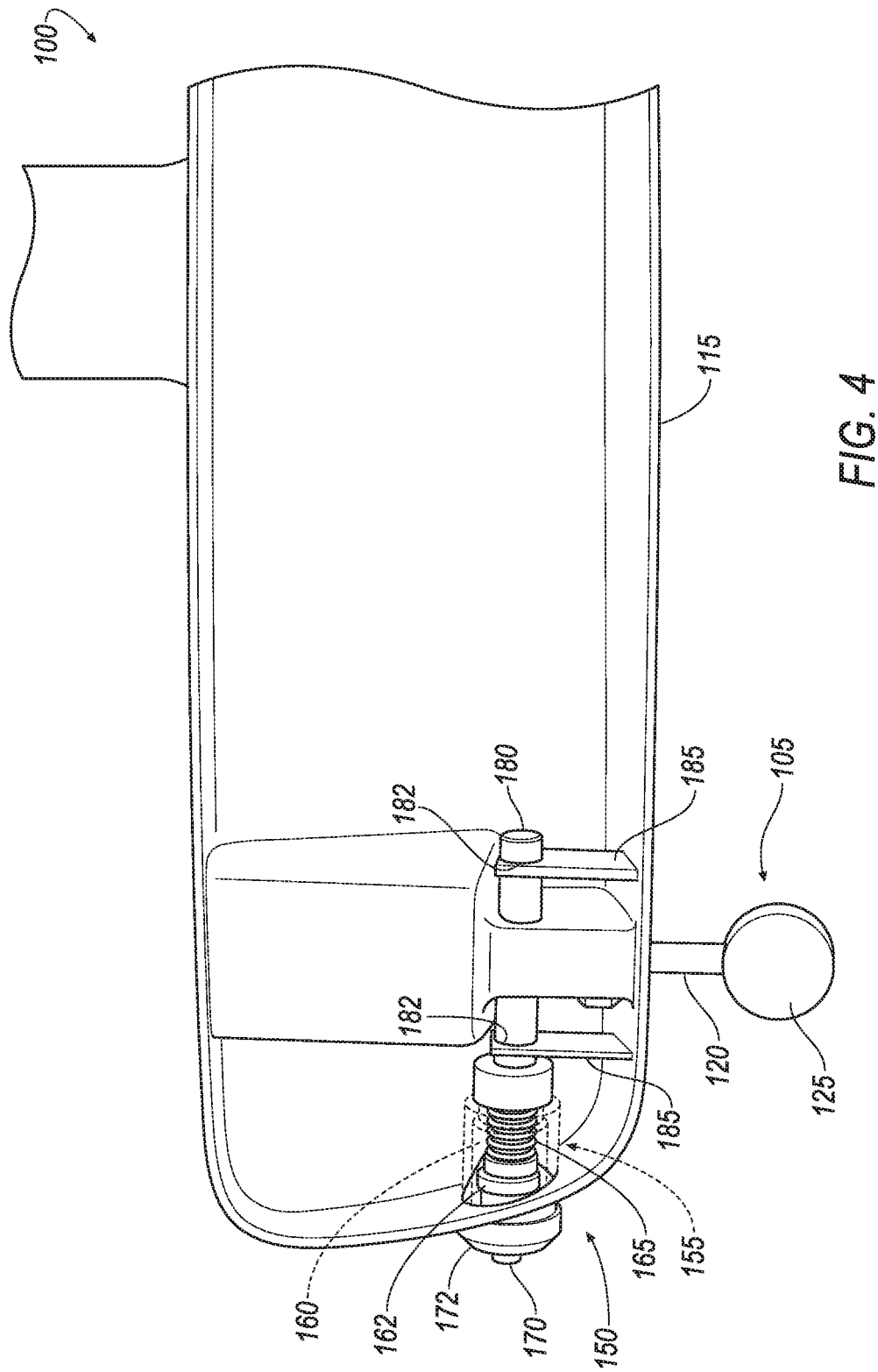
FIG. 4 illustrates a cut-away view of the vehicle rear-view mirror assembly illustrating a deploying mechanism of the mirror assembly.

FIG. 4 illustrates a cut-away view of the vehicle rear-view mirror assembly 100 illustrating a deploying mechanism 150 of the mirror assembly 100. The deploying mechanism 150 may be configured to move the bracket 105 from the stored position to the deployed positioned and vice-versa. The deploying mechanism 150 may include a spring mechanism 155 configured to release the bracket 105 from the stored position at the rear of the mirror and permit the bracket to hinge and rotate downward to the deployed position. The spring mechanism 155 includes a spring housing 160 and a torsion spring 162 and a linear spring 165 arranged in the housing.

The spring housing 160 may be coupled to a rod 180. The rod 180 may be coupled to the bracket arm 120 of the bracket 105. The bracket arm 120 and the rod 180 may form a "T" like arrangement where the bracket arm 120 interests the rod 180 perpendicularly and at a center thereof. The bracket arm 120 may be fixed to the rod 180 such that translation of the rod 180 may cause a translation of the bracket arm 120 and subsequently the bracket 105.

The rod 180 may be maintained within the mirror housing 115 by at least one support member 185. The support member 185 may include at least one opening 182 configured to receive the rod 180. The opening 182 may allow the rod to rotate therein while maintaining the rod 180 within the mirror housing 115. In the example shown in FIG. 4, two support members 185 are shown, though more or less may be included.

A button 170 is arranged on the spring housing 160. The button 170 is accessible from an exterior of the mirror housing 115. The button 170 may be pressed inward towards the mirror housing 115 to apply a force at the torsion spring 162. The torsion spring 162 may then rotate or twist in response to receiving force at the end proximate to the button 170. The rotation of the torsion spring 162 may then cause a rotation of the spring housing 160 and subsequently the rod 180. Upon rotation of the rod 180, the bracket 105 may rotate or hinge with the rod 180. Thus, the bracket 105 is arranged within the rear of the mirror housing 115 in the stored position and may rotate downward at the rod 180 to the deployed position.

Figure 5:
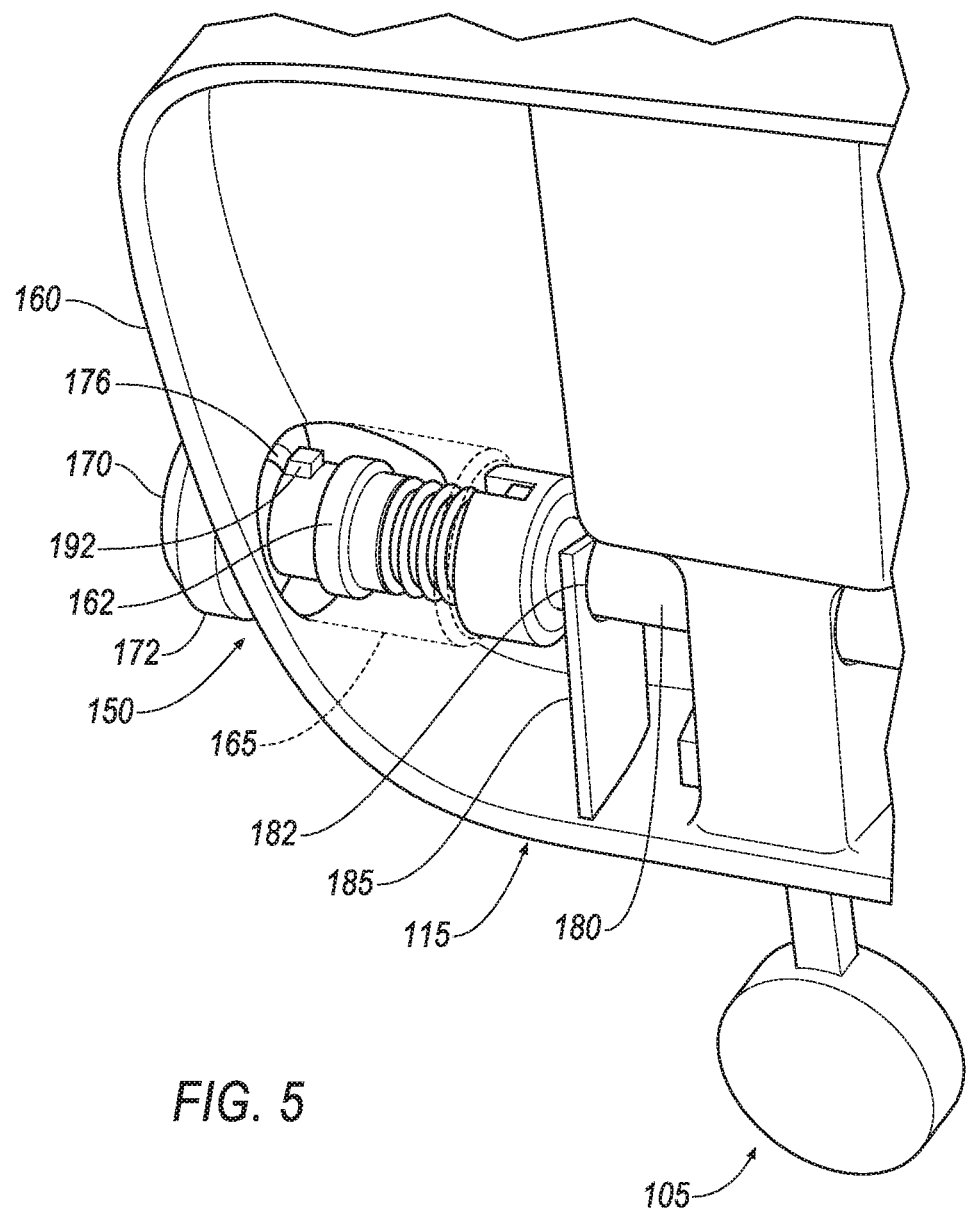
FIG. 5 illustrates a closer view of the deploying mechanism of FIG. 4.

FIG. 5 illustrates a closer view of the deploying mechanism 150 of FIG. 4. The deployment mechanism 150, as explained above may include a linear spring 165. The torsion spring 162 may be actuated in response to an actuation of the button 170 and may cause a rotation of the spring housing 160. The button 170 may include a button casing 172. The button casing may maintain the button within the mirror housing 115 and may allow the button to be depressed inward with respect to the housing.

The button 170 may interface with a spring casing 190. The spring casing 190 may be arranged inside the spring housing 160 and may surround at least the torsion spring 162. The spring casing 190 may move linearly inward toward the rod 180 in response to an actuation of the button 170. The spring casing 190 may include a latch 192. The button casing 172 may define a notch 176 configured to receive the latch 192. In the stored position, the notch 176 may be maintained within the latch 192. This may prevent rotational movement of the spring casing 190 and the spring housing 160. Thus, the bracket 105 may be maintained in a stored position due to the latch 192 and notch 176 preventing rotational movement of the rod 180.

Upon actuation of the button 170, the spring casing 190 may be moved laterally inward and the latch 192 may be disengaged from the notch 176. Upon disengagement, the spring casing 190 may be free to rotate due to the force created by the torsion spring 162. Upon rotation of the spring housing 160, the rod 180 may rotate, disengaging the bracket 105 from the rear of the mirror and allowing the bracket to rotate downward into the deployed position, as shown in FIG. 5.

The bracket 105 may assume the deployed position until the user no longer wishes the bracket 105 to be deployed. The user may then apply force to the bracket 105 (e.g., push the magnet 125 upward.) The rod 180 may thus rotate, causing the spring housing 160 and spring casing 190 to rotate. When the bracket 105 reaches the stored position, the latch 192 may align with the notch 176. Due to the biasing of the linear spring 165, the latch 192 may be forced into the notch 176, subsequently locking the spring casing 190 in a fixed position and preventing any rotation of the spring casing 190 and/or spring housing 160.

FIG. 6 illustrates a rear view of the rear-view mirror assembly 105 including a bracket recess 195 defined by the mirror housing 115 for retaining the bracket 105 when the bracket 105 is in the stored position. The recess 195 may define an aperture that is wide enough to receive at least a portion of the bracket 105. In the example shown in FIG. 6, the recess 195 receives the magnet 125 and the bracket arm 120. Thus, during non-use, the bracket 105 may be stored and hidden within the mirror housing 115 when not in use.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A mobile device holder for a rear-view mirror having a housing, comprising:
    a housing and a mobile device bracket arranged at least partially within the housing in a stored position;
    a deployment mechanism connected to the bracket and including a torsion spring configured to hinge the bracket from the stored position to a deployed position with the bracket extending out of the housing in response to actuation of the torsion spring, wherein the bracket includes an arm and a magnet arranged thereon to form a magnetic connection with a second magnet arranged on a mobile device.

2. The holder of claim 1, wherein the deployment mechanism includes a button configured to actuate the torsion spring.

3. The holder of claim 2, the button being accessible from an exterior of the mirror housing.

4. The holder of claim 2, wherein the button includes a button casing defining a notch and wherein the torsion spring is surrounding by a spring casing having a latch, the notch configured to receive the latch and lock the torsion spring in a fixed position.

5. The holder of claim 4, further comprising a linear spring arranged between the bracket and the torsion spring and configured to apply a biased force on the spring casing to maintain the latch within the notch.

6. The holder of claim 5, further comprising a rod connected to the bracket and retained within the housing via at least one support member, the rod connected by a hinge to the bracket to pivot from the stored position to the deployed position in response to rotation of the spring casing caused by the actuation of the button releasing the latch from the notch to permit rotation of the spring casing.

7. A method for deploying and storing a bracket for a mobile device from a vehicle rear view mirror, the method comprising:
    receiving an actuation at a button on an exterior of a rear view mirror housing,
    linearly translating a spring casing having a latch in response to the actuation of the button,
    disengaging the latch from a notch within the button allowing rotational translation of the spring casing with respect to the button, and
    pivoting a bracket connected to the spring casing from a stored position arranged behind the mirror housing to a deployed position arranged outside and below the mirror housing.

8. The method of claim 7, further comprising compressing a linear spring arranged between the spring casing and the bracket in response to the actuation at the button, the linear spring configured to apply a biasing force against the spring casing to retain the latch within the notch.

9. The method of claim 7, further comprising rotating a rod attached to the bracket concurrent with the rotation of the spring casing to rotate the bracket from the stored position to the deployed position.

10. The method of claim 9, wherein the rod is maintained in a fixed position within the mirror housing when the latch is arranged within the notch.

11. The method of claim 7, wherein the spring casing is rotated via a torsion spring arranged therein.

12. The method of claim 8, wherein the button is arranged on an exterior of the mirror housing.

13. The method of claim 7, wherein the bracket includes an arm and a magnet arranged thereon to form a magnetic connection with a second magnet arranged on a mobile device.

* * * * *